(12) United States Patent
Devaranjan et al.

(10) Patent No.: US 11,816,790 B2
(45) Date of Patent: Nov. 14, 2023

(54) UNSUPERVISED LEARNING OF SCENE STRUCTURE FOR SYNTHETIC DATA GENERATION

(71) Applicant: Nvidia Corporation, Santa Clara, CA (US)

(72) Inventors: Jeevan Devaranjan, Toronto (CA); Sanja Fidler, Toronto (CA); Amlan Kar, Toronto (CA)

(73) Assignee: Nvidia Corporation, Santa Clara, CA (US)

( * ) Notice: Subject to any disclaimer, the term of this patent is extended or adjusted under 35 U.S.C. 154(b) by 524 days.

(21) Appl. No.: 17/117,425

(22) Filed: Dec. 10, 2020

(65) Prior Publication Data

US 2021/0275918 A1    Sep. 9, 2021

Related U.S. Application Data

(60) Provisional application No. 62/986,614, filed on Mar. 6, 2020.

(51) Int. Cl.
| | |
|---|---|
| *G06T 17/00* | (2006.01) |
| *A63F 13/52* | (2014.01) |
| *G06F 16/51* | (2019.01) |
| *G06F 16/54* | (2019.01) |
| *G06N 3/08* | (2023.01) |
| *G06N 5/025* | (2023.01) |
| *G06T 15/20* | (2011.01) |
| *G06N 7/01* | (2023.01) |
| *G06V 10/25* | (2022.01) |

(Continued)

(52) U.S. Cl.
CPC ............. *G06T 17/00* (2013.01); *A63F 13/52* (2014.09); *G06F 16/51* (2019.01); *G06F 16/54* (2019.01); *G06N 3/08* (2013.01); *G06N 5/025* (2013.01); *G06N 7/01* (2023.01); *G06T 15/205* (2013.01); *G06V 10/25* (2022.01); *G06V 10/774* (2022.01); *G06V 20/20* (2022.01); *G06F 18/2148* (2023.01); *G06F 18/2155* (2023.01); *G06T 2210/61* (2013.01); *G06V 20/40* (2022.01)

(58) Field of Classification Search
None
See application file for complete search history.

(56) References Cited

U.S. PATENT DOCUMENTS

| | | | |
|---|---|---|---|
| 2002/0089508 A1 * | 7/2002 | Sowizral | ............... G06T 15/005 345/522 |
| 2015/0130788 A1 | 5/2015 | Bailiang | |

(Continued)

OTHER PUBLICATIONS

Extended European Search Report issued in EP Application No. 21160953.2 dated Dec. 23, 2021.

*Primary Examiner* — Jason T Yen
(74) *Attorney, Agent, or Firm* — Hogan Lovells US LLP

(57) ABSTRACT

A rule set or scene grammar can be used to generate a scene graph that represents the structure and visual parameters of objects in a scene. A renderer can take this scene graph as input and, with a library of content for assets identified in the scene graph, can generate a synthetic image of a scene that has the desired scene structure without the need for manual placement of any of the objects in the scene. Images or environments synthesized in this way can be used to, for example, generate training data for real world navigational applications, as well as to generate virtual worlds for games or virtual reality experiences.

23 Claims, 17 Drawing Sheets

Scene Structure 362

Scene Graph 364

(51) Int. Cl.
    *G06V 10/774*     (2022.01)
    *G06V 20/20*     (2022.01)
    *G06V 20/40*     (2022.01)
    *G06F 18/214*     (2023.01)

(56) References Cited

U.S. PATENT DOCUMENTS

2016/0343164 A1\* 11/2016 Urbach ................ G02B 27/017
2017/0153926 A1\* 6/2017 Callegari ................ G06T 17/10
2019/0156151 A1\* 5/2019 Wrenninge ........... G06F 18/214
2020/0004759 A1 1/2020 Brebner \* cited by examiner Rules:
Road – Lanes
Lanes – Lane Lanes | E
Lane – Sidewalk Cars | E
Cars – car Cars | E
Sidewalk – People | E
People – person People | E
FIG. 2A
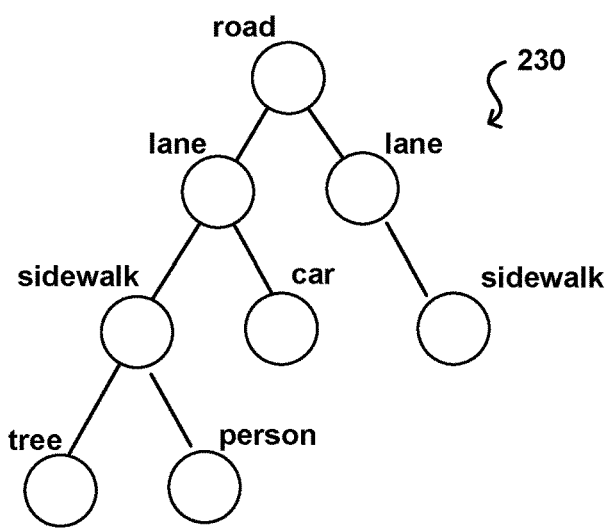
FIG. 2B
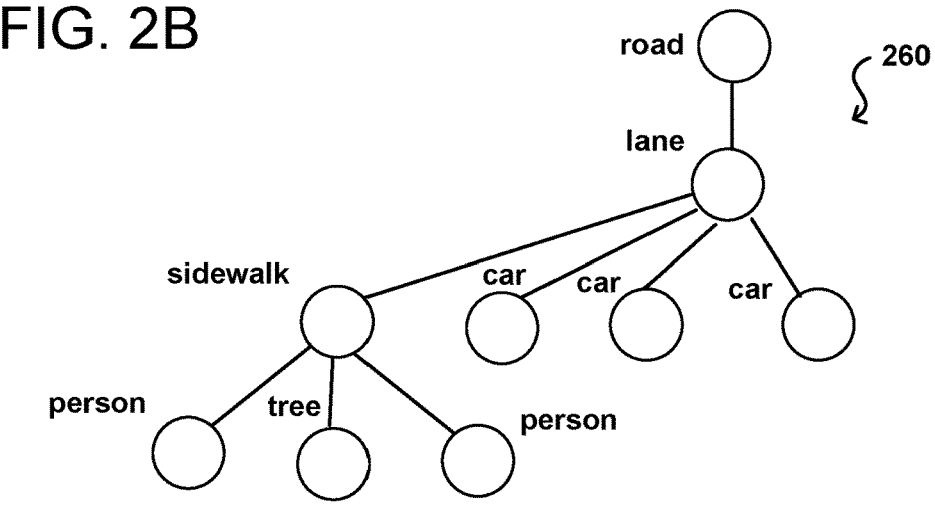
FIG. 2C

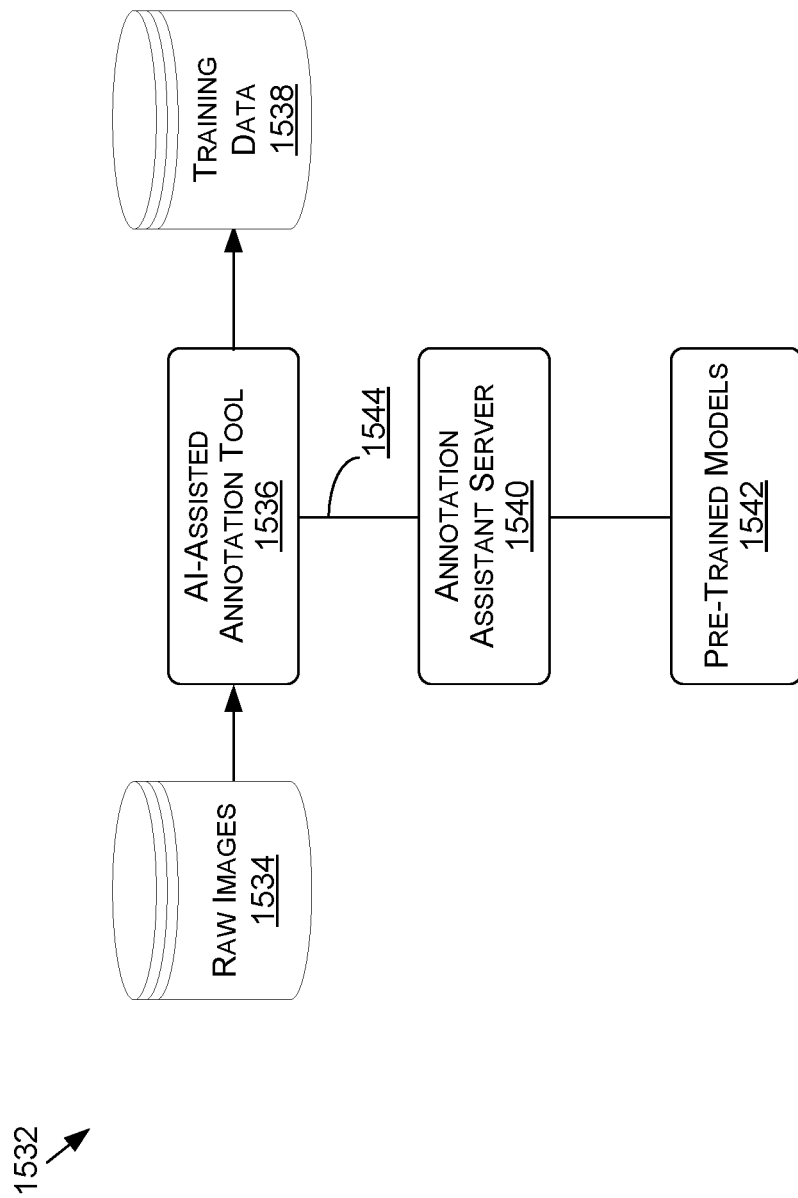

UNSUPERVISED LEARNING OF SCENE STRUCTURE FOR SYNTHETIC DATA GENERATION

CROSS-REFERENCE TO RELATED APPLICATIONS

This patent application claims priority to U.S. Provisional Patent Application Ser. No. 62/986,614, filed Mar. 6, 2020, and entitled "Bridging the Sim-to-Real Gap: Unsupervised Learning of Scene Structure for Synthetic Data Generation," which is hereby incorporated herein in its entirety for all purposes.

BACKGROUND

Applications such as gaming, animation, and simulation are increasingly relying upon more detailed and realistic virtual environments. In many instances, procedural models are used to synthesize scenes within these environments, as well as to create labeled synthetic datasets for machine learning. In order to produce realistic and diverse scenes, a number of parameters governing the procedural models must be carefully tuned by experts. These parameters control both the structure of scenes being generated (e.g. how many cars in the scene), as well as parameters that place objects in valid configurations. The complexity and amount of knowledge to manually determine and tune these parameters, as well as to configure other aspects of these scenes, can limit widespread adoption, and can also limit the realism or extent of the environments generated.

BRIEF DESCRIPTION OF THE DRAWINGS

Various embodiments in accordance with the present disclosure will be described with reference to the drawings, in which:

FIGS. 2A, 2B, and 2C illustrate rules and graphs for a scene, according to at least one embodiment;

FIGS. 15A and 15B illustrate a data flow diagram for a process to train a machine learning model, as well as client-server architecture to enhance annotation tools with pre-trained annotation models, in accordance with at least one embodiment.

DETAILED DESCRIPTION

Figure 1A:
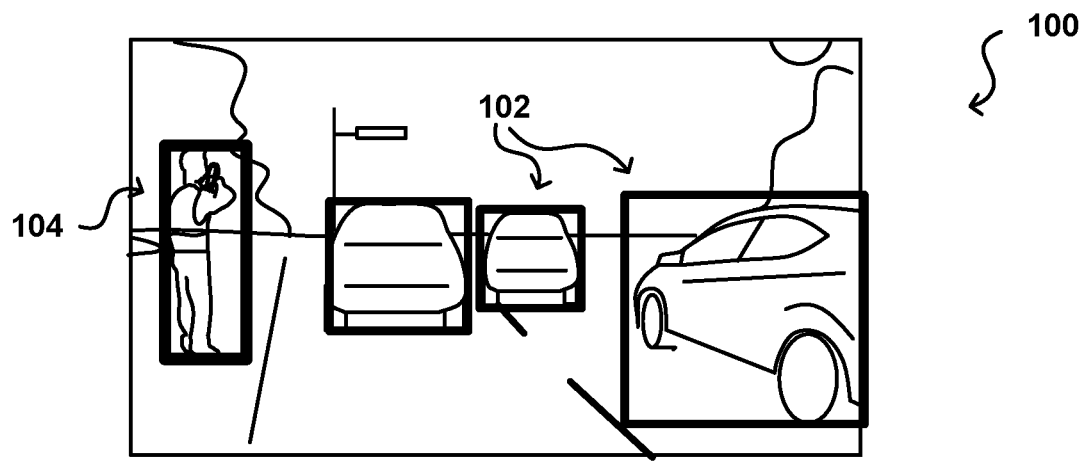
FIGS. 1A and 1B illustrate images that can be generated, according to at least one embodiment.
Figure 1B:
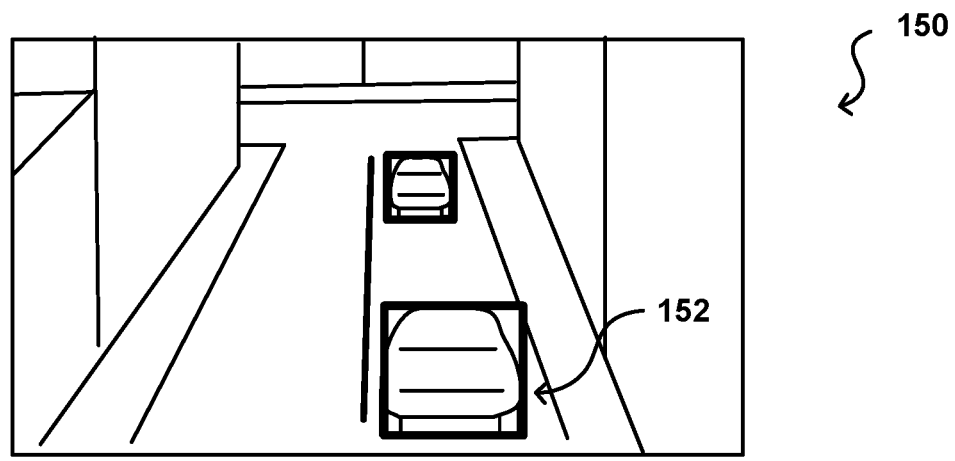

Approaches in accordance with various embodiments can provide for the generation of synthetic images and datasets. In particular, various embodiments can generate virtual scenes or environments based at least in part upon a set of rules that define the placement and appearance of objects, or "assets," within that environment. These datasets can be used for generating virtual environments, as well as for generating large training datasets that are relevant to a target realistic dataset. Synthetic datasets provide an appealing opportunity for training machine learning models for use in tasks such as perception and planning in autonomous and semi-autonomous driving, indoor scene perception, generative content creation, and robotic control. Via graphics engines, synthetic datasets can provide ground-truth data for tasks in which labels are expensive or even impossible to obtain, such as segmentation, depth, or material information. As illustrated in the images 100, 150 of FIGS. 1A and 1B, this can include ground truth data for objects rendered in those images, such as bounding boxes and labels for automobiles 102, 152 and people 104 rendered in those images. Adding a new type of label to such a synthetic dataset can be performed by making a call to a renderer, rather than embarking on a time-consuming annotation endeavor that requires new tooling and hiring, training, and overseeing annotators.

Using conventional approaches, creating synthetic datasets comes with various hurdles. While content, such as three-dimensional computer-aided design (3D CAD) models that make up a scene, can be obtained from sources such as online asset stores, artists often must write complex procedural models that synthesize scenes by placing these assets in realistic layouts. This often requires browsing through massive amounts of real imagery to carefully tune a procedural model, which can be a very time consuming task. For scenarios such as street scenes, creating synthetic scenes relevant for one city may require tuning a procedural model made for another city from scratch. Approaches in accordance with various embodiments can attempt to provide automated approaches for handling these and other such tasks.

In one approach, scene parameters in a synthetically-generated scene can be optimized by exploiting the visual similarity of generated (e.g., rendered) synthetic data with real data. Scene structure and parameters can be represented in a scene graph, with data generated by sampling a random scene structure (and parameters) from a given probabilistic grammar of scenes, then modifying the scene parameters using a learnt model. Since such an approach only learns scene parameters, a simulation-to-real gap remains in the scene structure remains. For example, one would likely find a higher density of cars, people, and buildings in Manhattan than in a quaint village in Italy. Other work on generative models of structural data such as graphs and grammar strings requires large amounts of ground truth data for training to generate realistic samples. However, scene structures are extremely cumbersome to annotate and thus not available in most real datasets.

Approaches in accordance with various embodiments can utilize a procedural generative model of synthetic scenes that is learned, unsupervised, from real imagery. In at least one embodiment, one or more scene graphs can be generated object-by-object by learning to sample rule expansions from a given probabilistic scene grammar and generate scene parameters Learning without supervision for such a task can be challenging, due at least in part to the discrete nature of the scene structures to be generated and the presence of a non-differentiable renderer in the generative process. To this end, a feature space divergence can be utilized to compare generated (e.g., rendered) scenes with real scenes, which can be determined for individual scenes. Such an approach can allow credit assignment for training with reinforcement learning. Experimentation on two synthetic datasets and a real dataset indicated that an approach in accordance with at least one embodiment significantly reduces the distribution gap between scene structures in generated and target data, improving over human priors on scene structure by learning to closely align with target structure distributions. On a real dataset, starting from minimal human priors, the structural distribution in the real target scenes can be almost exactly recovered, which is notable given that this model may be trained without any labels. An object detector trained on this generated data has been shown to outperform detectors trained on data generated with human priors, for example, and demonstrates improvements in distribution similarity measures of generated rendered images with real data.

Instead of running inference per scene as in a prior approach, approaches in accordance with various embodiments can generate new data that resembles a target distribution. One approach would be to learn to optimize non-differentiable simulators using a variational upper bound of a GAN-like objective, or to optimize simulator parameters for control tasks by directly comparing real and simulated trajectories. An approach in accordance with at least one embodiment can learn to generate discrete scene structures constrained to a grammar, while optimizing a distribution matching objective (with Reinforcement Learning) instead of using adversarial training. Such an approach can be used to generate large and complex scenes, as opposed to images of single objects or faces.

In at least one embodiment, generative models composed of graphs and trees can produce graphs with richer structure with more flexibility over grammar-based models, but may fail to produce syntactically correct graphs for cases with a defined syntax, such as programs and scene graphs. Grammar-based methods have been used for a variety of tasks such as program translation, conditional program generation, grammar induction, and generative modelling on structures with syntax, such as molecules. These methods, however, assume access to ground-truth graph structures for learning. Approaches in accordance with various embodiments can train a model in an unsupervised fashion, without any ground truth scene graph annotations.

In at least one embodiment, a set of rules can be generated or obtained for a virtual scene or environment to be generated. For example, an artist might generate or provide a set of rules to be used for a scene, or may select from a library of rule sets for various scenes. This may include, for example, browsing scene type options through a graphical interface and selecting a scene type that has an associated set of rules, as may correspond to scene types such as European city, American countryside, dungeon, and so on. For a given virtual or "synthetic" scene, an artist may also create or obtain content for various objects (e.g., "assets") in a scene, as may include models, images, textures, and other features that can be used to render those objects. The rules provided can indicate how these objects should relate to one another in a given scene.

For example, FIG. 2A illustrates an example rule set 200 that can be utilized in accordance with various embodiments. This rule set can include any number of rules, or up to a maximum number in some embodiments. Each rule can define a relationship between at least two types of objects to be represented in a synthetic scene. This rule set applies to a location where there will be roads and sidewalks. As illustrated in the rule set 200, a road can have lanes according to a first rule. According to additional rules, that can be a single lane or multiple lands, and each lane may be associated with a sidewalk and one or more cars. As illustrated, rules can also define whether a type of object can have one or multiple instances of that type of object associated with given object type. Another pair of rules indicates that there can be one or more people on a sidewalk in this scene.

Such rules can be used to generate one or more scene structures that are representative of a scene to be generated. Two example scene structures 230, 260 are illustrated in FIGS. 2B and 2C. In each of these structures, a road is illustrated as a main, parent node in a hierarchical tree structure. The rules from the rule set 200, and the relationships defined therein, determine potential parent-child relationships that can be used to generate different tree structures that conform to those relationships. In at least one embodiment, a generative model can generate these scene structures from the rule set using an appropriate sampling or selection process. In the structure 230 of FIG. 2B, there is a double lane road where each lane has a sidewalk, and there is a car in one of the lanes. There is also a tree and a person proximate the sidewalk by the lane with the car. In the structure 260 of FIG. 2C, there is a single lane road that has three cars and a sidewalk, with two people and a tree proximate the sidewalk. As can be seen, these structures represent two different scenes that were generated from the same rule set. Such an approach can be used to build out, supplement, augment, generate, or synthesize a virtual environment including variations of object structure that all adhere to the selected rule set. Using such an approach, a single rule set can be used to generate an environment that is as large as desired, with variations that can be random or adhere to a variation policy, without a user having to manually select or place these objects. Such a method can be used to generate synthetic scenes from real imagery in an unsupervised fashion. It at least one embodiment, such an approach can learn a generative model of scene structure, samples from which (with additional scene parameters) can be rendered to create synthetic images and labels. In at least one embodiment, such an approach can be used to generate synthetic training data with appropriate labels, using unlabeled real data. The rule set and unlabeled real data can be provided as input to a generative model, which can generate a set of diverse scene structures.

Approaches in accordance with at least one embodiment can learn such a generative model for synthetic scenes. In particular, given a dataset of real imagery $X_R$, the problem is to create synthetic data $D(\theta)=(X(\theta), Y(\theta))$ of images $X(\theta)$ and labels $Y(\theta)$ that is representative of $X_R$, where $\theta$ represents the parameters of the generative model. Advances in graphics engines and rendering can be exploited in at least one embodiment by stipulating that the synthetic data D is the output of creating an abstract scene representation, and rendering that scene representation with a graphics engine. Rendering can ensure that low-level pixel information in $X(\theta)$ (and its corresponding annotation $Y(\theta)$) does not need to be modeled. Ensuring the semantic validity of sampled scenes may require imposing at least some constraints on their structure. Scene grammars use a set of rules to greatly reduce the space of scenes that can be sampled, making learning a more structured and tractable problem. For example, a scene grammar could explicitly enforce that a car can only be on a road which then need not be implicitly learned. Approaches in accordance with various embodiments can leverage this in part by using probabilistic scene grammars. Scene graph structures can be sampled from a prior imposed on a probabilistic context-free grammar (PCFG), which is referred to herein as a structure prior. Parameters can be sampled for every node in the scene graph from a parameter prior and learned to predict new parameters for each node, keeping the structure intact. Resulting generated scenes therefore come from a structure prior (which is context-free) and the learnt parameter distribution, which can result in a simulation-to-real gap in the scene structures.

Figure 3A:
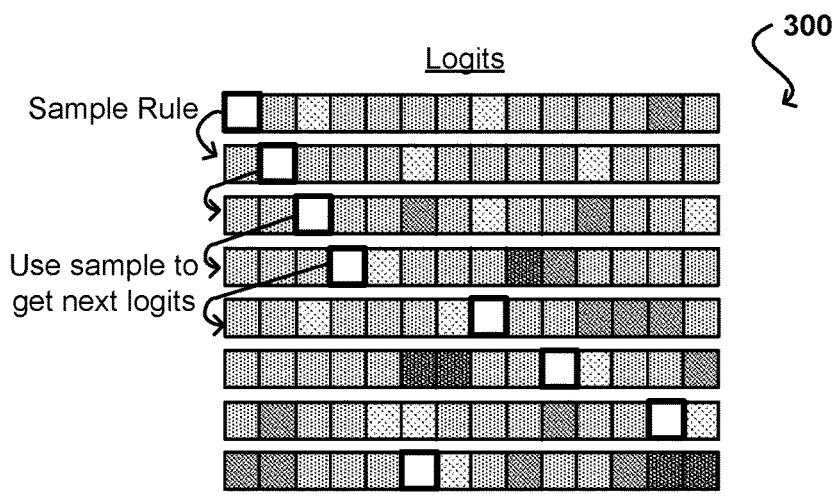
FIGS. 3A, 3B, and 3C illustrate stages of scene graph generation, according to at least one embodiment.
Figure 3B:
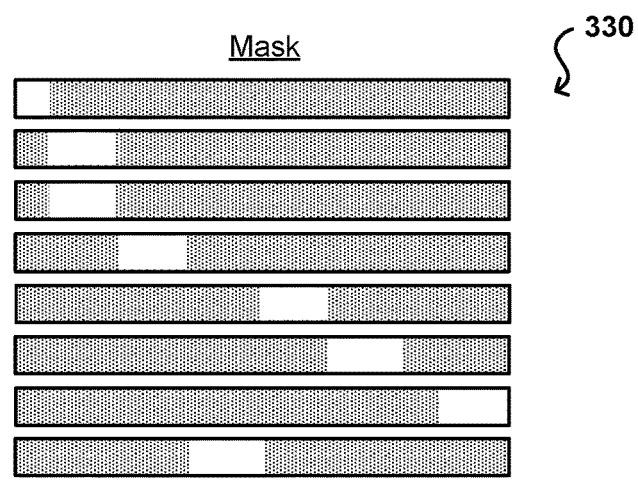
Figure 3C:
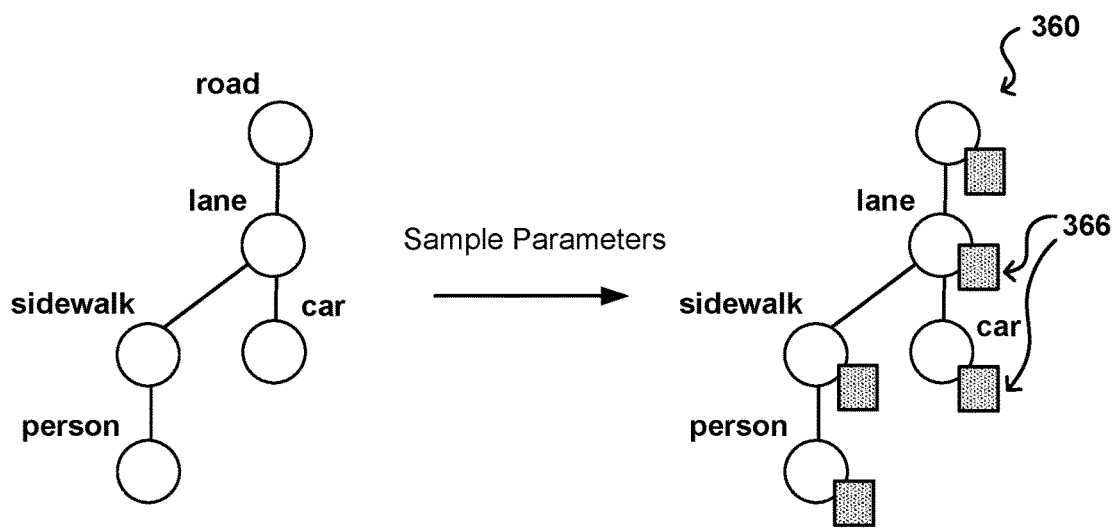

Approaches in accordance with various embodiments can alleviate at least this gap by learning a context-dependent structure distribution unsupervised of synthetic scenes from images. In at least one embodiment, one or more scene graphs can be used as an abstract scene representation, which can be rendered into a corresponding image with labels. FIGS. 3A through 3C illustrates components that can be used at different stages of such a process. FIG. 3A illustrates a set of logits 300 generated from rule samples, where a given sample is used to determine the next logit. FIG. 3B illustrates a corresponding mask 330 that can be utilized in generating a scene graph. In a generative process for a scene graph, the logits and mask are of shape $T_{max} \times K$. In FIG. 3, unpatterned (e.g., solid white) regions represent represents a higher value while pattern-filled regions represent a lower value. At each time step, such a process can autoregressively sample a rule and predict the logits for the next rule conditioned on the sample, capturing context dependencies. The sampling can be used to generate a scene structure 362, as illustrated in FIG. 3C, as well as to determine parameters for nodes of that scene structure. These parameters can include, for example, information like location, height, and pose. These and other parameters 366 can be sampled and applied for each node in the scene structure, to generate a full scene graph. Such a process can thus utilize sampled rules from the grammar and convert these into a graph structure. In this example, only objects that are able to be rendered are kept from the full grammar string. Parameters for every node can be sampled from a prior, or optionally learnt. A generated scene graph can be rendered as illustrated. Such a generative model can sequentially sample expansion rules from a given probabilistic scene grammar to generate a scene graph which is rendered. This model can be trained unsupervised and with reinforcement learning, using a feature-matching based distribution divergence specifically designed to be amenable to such a setting.

Scene graphs can be advantageous in at least some embodiments due to their ability, in fields such as computer graphics and vision, to describe scenes in a concise hierarchical manner, where each node describes an object in the scene along with its parameters. Parameters can relate to aspects such as a 3D asset or pose. Parent-child relationships can define the parameters of a child node relative to its parent, enabling straightforward scene editing and manipulation. Additionally, camera, lighting, weather, and other effects can be encoded into the scene graph. Generating corresponding pixels and annotations can amount to placing objects into the scene in a graphics engine and rendering with the defined parameters.

In at least one embodiment, the set of rules can be defined as a vector, with the vector having a length equal to the number of rules. A network can then be used to determine which of these rules to expand, and these rules can be expanded sequentially at different time steps. For each scene structure to be generated, a categorial distribution can be generated over all the relevant rules in a set. A generative network can then sample from this categorical distribution to select the rules to use for this scene, where that categorical distribution can also be masked such that certain rules are forced to have a probability of zero so that they are not selected. The network can also infer which rule or option to expand for each object. In at least one embodiment, this generative model can be a recurrent neural network (RNN). The latent vector that defines the scene can be input to this RNN to sequentially generate and expand the rules for the scene, based on the determined probabilities. The RNN travels down the tree, or stack, until all rules have been processed (or a maximum number of rules is reached).

In one or more embodiments, each row in FIG. 3A can correspond to a sample rule. As illustrated in FIG. 3B, the mask 330 can then be used to indicate to the model which rules are to be expanded at a given time step. This process can be performed iteratively to generate a valid scene description. Further, the relationships between objects in the scene graph also provide geometric constraints for the scene, as these objects cannot exist outside a specified relationship, such as a car not being able to be positioned outside a lane or on a sidewalk. The parameters for a node define various visual attributes, such that roads in the New Zealand countryside will look different than roads in a big city in Thailand. In at least some embodiments, there may be ranges set for these various parameters for certain types of objects, such that sidewalks only come in certain widths, roads only have up to a limited number of lanes, and so on.

These data structures can also be used to perform additional learning. For example, this data can be used downstream to train a model to, for example, detect cars in captured image data. This structure could be retained with a generated image, for example, to help the model more quickly be able to identify cars based on where they would occur in the scene structure.

In at least one embodiment, a context-free grammar G can be defined as a list of symbols (e.g., terminal and non-terminal) and expansion rules. Non-terminal symbols have at least one expansion rule into a new set of symbols. Sampling from a grammar can involve expanding a start symbol (or initial or parent symbol) until only non-terminal symbols remain. A total number of expansion rules K can be defined in a grammar G. Scene grammars can be defined, and strings sampled from the grammar represented, using one or more scene graphs. For each scene graph, a structure T can be sampled from the grammar G followed by sampling corresponding parameters a for every node in the graph. In at least one embodiment, a convolutional network is used with this scene graph to sample one set of parameters for every single node in the graph.

In various approaches, a generative model can be utilized that has graphs constrained by a grammar. In at least one embodiment, a latent vector z can be mapped to unnormalized probabilities over all possible grammar rules in an autoregressive manner, using a recurrent neural network.

This can continue for a maximum of $T_{max}$ steps in such an embodiment. In at least one embodiment, one rule $r_t$ can be sampled at every time step, and this rule can be used to predict logits for the next rule $f_{t+1}$. This allows this model to capture context-dependent relationships easily, as opposed to the context-free nature of scene graphs conventional approaches. Given a list of at most $T_{max}$ sampled rules, the corresponding scene graph is generated by treating each rule expansion as a node expansion in the graph as illustrated in FIG. 3.

To ensure validity of these sampled rules in each time step t, a last-in-first-out (LIFO) stack of unexpanded non-terminal nodes can be maintained. Nodes can be popped from the stack and expanded according to the sampled rule-expansion, with the resulting new non-terminal nodes then pushed to the stack. When a non-terminal is popped, a mask $m_t$ can be created that is of size K, which is 1 for valid rules from that non-terminal and 0 otherwise. Given the logits for the next expansion $f_t$, the probability of a rule $r_{t,k}$ can be given by:

$$p(r_t = k | f_t) = \frac{m_{t,k} e^{f_{t,k}}}{\sum_{j=1}^{K} m_{t,j} e^{f_{t,j}}}$$

Sampling from this masked multinomial distribution can ensure that only valid rules are sampled as $r_t$. Given the logits and sampled rules, $(f_t, r_t) \forall t \in 1 \ldots T_{max}$, the probability of the corresponding scene structure T given z can be given by:

$$q_\theta(T|z) = \sum_{t=1}^{T_{max}} p(r_t | f_t)$$

Putting this all together, images can be generated by sampling a scene structure $T \sim q_\theta(\cdot|z)$ from the model, followed by sampling parameters for every node in the scene $\alpha \sim q(\cdot|T)$ and rendering an image $v' = R(T,\alpha) \sim q_I$. For some $v' \sim q_I$, with parameters a and structure T, an assumption can be made as given by:

$$q_I(v'|z) = q(\alpha|T) q_\theta(T|z)$$

Various training approaches can be utilized for such a generative model. In at least one embodiment, this training can be performed using variational inference or by optimizing a measure of distribution similarity. Variational inference allows using reconstruction-based objectives by introducing an approximate learnt posterior. Using variational inference to train such a model may be challenging due at least in part to the complexity coming from discrete sampling and having a renderer in the generative process. Moreover, a recognition network here may amount to doing inverse graphics—an extremely challenging problem in itself. In at least one embodiment, a measure of distribution similarity of the generated and target data can be optimized. Adversarial training of a generative model can be utilized with reinforcement learning (RL), such as by carefully limiting the capacity of the critic. In at least one embodiment, reinforcement learning can be used to train a discrete generative model of scene graphs. A metric can be computed for every sample, which can significantly improve the overall training process.

A generative model can be trained to match the distribution of features of the real data in the latent space of some feature extractor $\phi$. The real feature distribution can be defined by $p_f$ s.t $F \sim p_f \Leftarrow \Rightarrow F = \phi(v)$ for some $v \sim p_I$. Similarly, the generated feature distribution can be defined as given by $q_f$ s.t $F \sim q_f \Leftarrow \Rightarrow F = \phi(v)$ for some $v \sim q_I$. Distribution matching can be accomplished in at least one embodiment by approximately computing $p_f$, $q_f$ from samples and minimizing the KL divergence from $p_f$ to $q_f$. In at least one embodiment, a training objective can be given by:

$$\min_\theta KL(q_f \| p_f)$$

$$\min_\theta E_{F \sim q_f} [\log q_f(F) - \log p_f(F)]$$

Using the feature distribution definition above, an equivalent objective can be given by:

$$\min_\theta E_{v \sim q_I} [\log q_f(\varphi(v)) - \log p_f(\varphi(v))]$$

The true underlying feature distributions $q_f$ and $p_f$ can be intractable to compute. In at least one embodiment, approximations $\tilde{q}_f(F)$ and $\tilde{p}_f(F)$ can be used, computed using kernel density estimation (KDE). One example approach can let $V = \{v_1, \ldots, v_l\}$ and $B = \{v'_1, \ldots, v'_m\}$ be a batch of real and generated images. Performing KDE with B,V to estimate $q_f$, $p_f$ yields:

$$\tilde{q}_f(F) = \frac{1}{m} \sum_{j=1}^{m} K_H(F - \varphi(v'_j))$$

$$\tilde{p}_f(F) = \frac{1}{l} \sum_{j=1}^{l} K_H(F - \varphi(v_j))$$

where $K_H$ is the standard multivariate normal kernel with bandwidth matrix H. Here, H=dI can be used, where d is the dimensionality of the feature space.

A generative model in accordance with at least one embodiment can make a discrete (e.g., non-differentiable) choice at each step, such that it can be advantageous to optimize the objective using reinforcement learning techniques. Specifically, this can include using the REINFORCE score function estimator along with a moving average baseline, whereby the gradients may be given by:

$$\nabla_\theta \mathcal{L} \approx \frac{1}{M} \sum_{j=1}^{m} (\log \tilde{q}_f(\varphi(v'_j)) - \log \tilde{p}_f(\varphi(v'_j))) \nabla_\theta \log q_I(v'_j)$$

where M is the batch size, $\tilde{q}f(F)$ and $\tilde{p}f(F)$ are density estimates defined above.

It can be noted that the gradient above requires computing the marginal probability $q_I(v')$ of a generated image v', instead of the conditional $q_I(v'|z)$. Computing the marginal probability of a generated image involves an intractable marginalization over the latent variable z. To circumvent this, a fixed finite number of latent vectors from a set Z can be used that are sampled uniformly, enabling easy marginalization. This translates to:

$$q_\theta(T) = \frac{1}{|Z|}\sum_{z \in Z} q_\theta(T|Z)$$

$$q_I(v') = q(\alpha|T)q_\theta(T|Z)$$

Such an approach can still provide enough modeling capacity, since there are only finitely many scene graphs of a maximum length $T_{max}$ that can be sampled from the grammar. Empirically, using one latent vector may be sufficient, as stochasticity in the rule sampling can make up for lost stochasticity in the latent space.

In at least one embodiment, pre-training can be an important step. A handcrafted prior can be defined on scene structure. For example, a simple prior could be to put one car on one road in a driving scene. The model can be pre-trained, at least in part, by sampling strings (e.g., scene graphs) from the grammar prior, and training the model to maximize the log-likelihood of these scene graphs. Feature extraction can also be an important step for distribution matching, as the features need to capture structural scene information such as the number of objects and their contextual spatial relationships for effective training.

During training of a model, sampling may result in incomplete strings generated with at most $T_{max}$ steps. Accordingly, a scene graph T can be repeatedly sampled until its length is at most $T_{max}$ To ensure that this does not require too many attempts, the rejection rate $r_{reject}(F)$ of a sampled feature F can be recorded as the average failed sampling attempts when sampling the single scene graph used to generate F. A threshold f can be set on $r_{reject}(F)$ to represent the maximum allowable rejections, as well as weight A, which can then be added to the original loss as may be given by:

$$\mathcal{L}' = E_{F \sim qF}[\log q_f(F) - \log p_f(F) + \lambda 1_{(\epsilon, \infty)}(r_{reject}(F))]$$

Empirically, it was found that values of $\lambda = 10^{-2}$ and f=1 worked well in at least one embodiment.

Such an approach can provide for unsupervised learning of a generative model of synthetic scene structures by optimizing for visual similarity to real data. Inferring scene structures is notoriously hard, even when annotations are provided. Approaches in accordance with various embodiments can perform this generative portion without any ground truth information. Experiments have verified the ability of such a model to learn a plausible posterior over scene structures, significantly improving over manually-designed priors. Approaches can optimize for both the scene structure and parameters of a synthetic scene generator in order to produce satisfactory results.

As mentioned, such an approach to generating diverse scene graphs can enable generation of scenes or environments that mimic the real world, or a target world or environment. Information for this world or environment can be learned directly from pixels of example images of the real or target world. Such an approach may be used to attempt an exact reconstruction, but in many embodiments can allow for the generation of infinitely many diverse worlds and environments that may be based at least in part upon these real or target worlds. A rule set or scene grammar can be provided that describes a world at a micro level, defining object-specific relationships. Instead of a person having to manually generate at least a layout for each scene or image, for example, that person can specify or select rules that can be used to automatically generate that scene or image. A scene graph in at least one embodiment can provide a full description of the layout of a three-dimensional world. In at least one embodiment, the recursive expansion of rules to generate a scene structure can also be used to generate a string that provides a complete representation or definition of the layout of a three-dimensional scene. As mentioned, a generative model can be used to perform the expansion and generate the scene structure. In at least one embodiment, this scene structure can be stored as a JSON file or using another such format. This JSON file can then be provided as input to a rendering engine for generating an image or scene. The rendering engine can pull the appropriate asset data for use in rendering the individual objects.

As mentioned, this rendered data can be used to present a virtual environment, such as for a gaming or VR application. This rendering also can be used to generate training data for such an application, as well as other applications such as training models for autonomous or semi-autonomous machines, such as for vehicle navigation or robotic simulation. There may be different libraries of assets that can be selected for these renderings, such that environments may be appropriate for different geographic locations, points in time, etc. Each pixel in a rendered image can be labeled to indicate which type of object that pixel represents. In at least one embodiment, bounding boxes or other positional indicators can be generated for each object, as well as a depth determined for each pixel in the 3D scene, the normal at that pixel location, etc. This information can be extracted from a rendering engine in at least some embodiments by utilizing an appropriate rendering function to extract the data.

In at least one embodiment, an artist can provide a set of assets and select a set of rules, and an entire virtual environment can be generated without manual input by that artist. In some embodiments, there may be libraries of assets from which that artist can select. For example, an artist could select a scene structure for "Japanese cities" and assets for "Japanese cities" in order to have an environment generated that is based on Japanese cities, including appropriate visual objects and layouts, but that does not directly correspond or represent any Japanese city. In some embodiments, an artist may have an ability to adjust this environment by indicating things that the artist likes or does not like. For example, an artist may not want cars on the streets for this application. Accordingly, an artist may indicate that the artist does not want cars included, or at least included in specific areas or associated with specific object types, and a new scene graph can be generated that has removed cars and updated the appropriate relationships. In some embodiments a user can provide, obtain, utilize, or generate two or more sub-graphs, such as may indicate things the user likes and things the user does not like. These sub-graphs can then be used to generate new scenes that are more inline with user expectations. Such an approach can enable a user to easily generate virtual environments with specific aspects and visual appearance without any expert knowledge of the creation process, or need to manually place, move, or adjust objects in a scene, or set of scenes. Such an approach can enable an average person to become a 3D artist with minimal effort on the part of the person.

Figure 4:
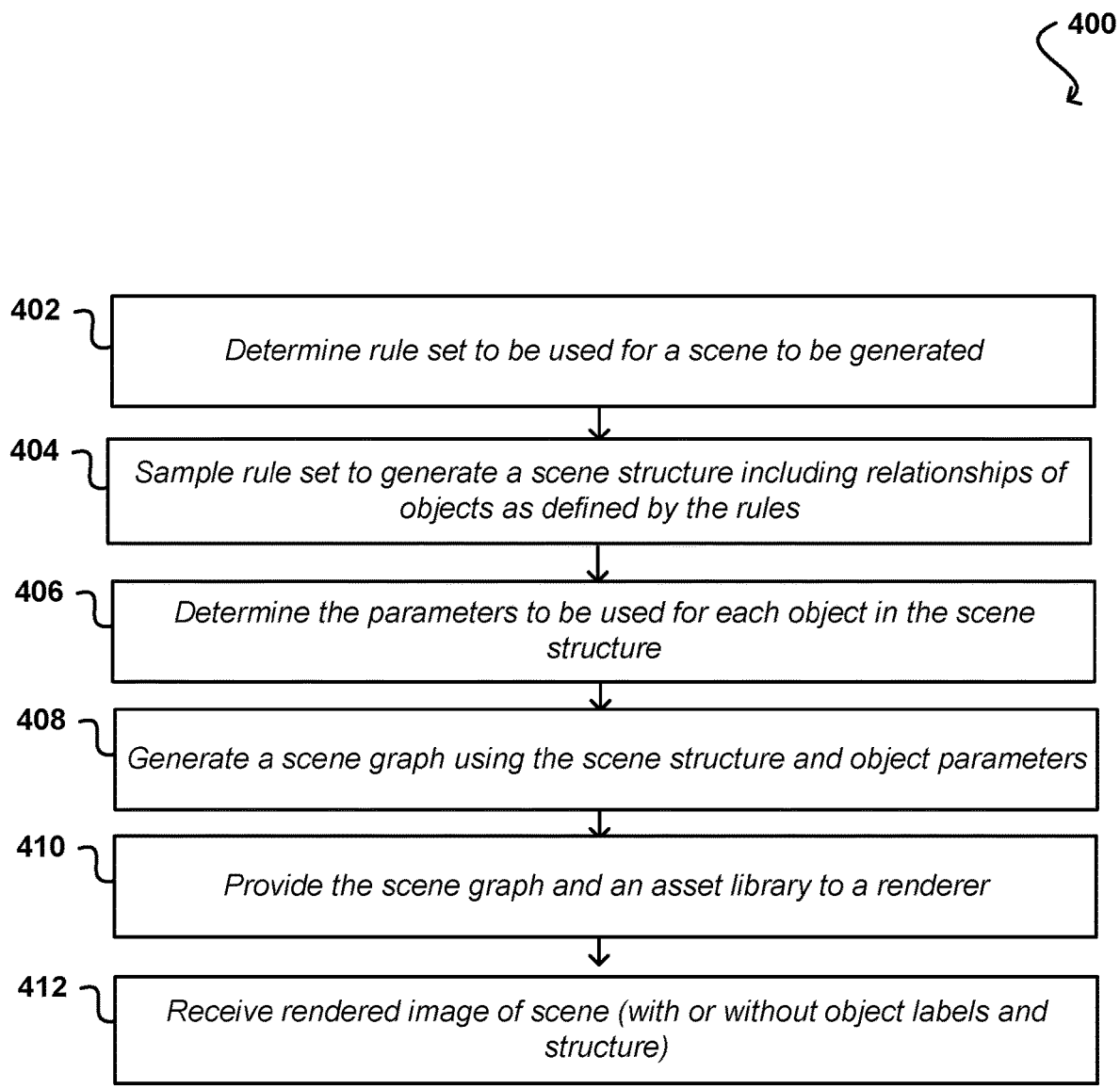
FIG. 4 illustrates a process for generating an image from a scene grammar, according to at least one embodiment.

FIG. 4 illustrates an example process 400 for generating an image of a scene that can be utilized in accordance with various embodiments. It should be understood that for this and other processes presented herein that there can be additional, fewer, or alternative steps performed in similar or alternative order, or at least partially in parallel, within scope of various embodiments unless otherwise specifically stated.

In this example, a rule set is determined 402 that is to be used for at least one scene to be generated. This may include a user generating these rules or selecting from a number of rule sets, among other such options. Individual rules in the set can define relationships between types of object in the scene. This rule set can be sampled 404, as may be based upon determined probabilities, to generate a scene structure that includes relationships of objects as defined by the rules. In at least one embodiment, this can include a hierarchical scene structure with nodes of the hierarchy corresponding to types of objects for the scene. The parameters to be used in rendering each of these objects can be determined 406, such as by sampling from an appropriate dataset. A scene graph can then be generated 408 that can be based on the scene structure but with appropriate parameters applied for the individual nodes or objects. The scene graph can be provided 410, along with an asset library or other source of object content, to a renderer 410 or other object for generating the image or the scene. A rendered image of the scene can be received 412 that was rendered based on the determined scene graph. This rendered image may include object labels, as well as retain the scene structure, if the image is to be used as training data as discussed herein.

Various approaches can be used to train neural networks discussed herein. For example, a generative model can be trained to analyze unlabeled images, which may correspond to captured images of real world settings. The generative network can then be trained to generate scenes with similar appearance, layout, and other such aspects. There can be both real scenes and synthetic scenes. Whenever you pass these scenes to a deep neural network, a set of features can be extracted in that scene that correspond to positions in a high-dimensional space, such as 1,000-dimensional space. This scene can then be thought of as being composed of these points in this high-dimensional space, rather than pixels in an image. The network can be trained so that features that correspond to synthetic scenes in this feature space align with features that correspond to real scenes. In this way, it may be difficult to differentiate between features of real and synthetic scenes in feature space.

In at least one embodiment, this can be accomplished using reinforcement learning. As mentioned, a goal can be to align two entire datasets, but without any data or correlations about specific feature points that should be aligned since this is an unsupervised space without correlations. Since the goal in many situations will not be to generate exact copies of scenes but to generate similar scenes, it can be sufficient to align the distributions of feature points in this feature space. Accordingly, a training procedure can compare the real and synthetic scenes holistically. In order to evaluate a scene, that scene in feature space can be compared against a distribution of feature points for other scenes. In various approaches, given just a comparison of signals it can be difficult to determine whether a scene is realistic or useful, other than whether the structure was appropriate. Accordingly, a training approach in accordance with at least one embodiment can extract the signal from every single data point itself, without having to look at the entire dataset. In this way, a signal can be evaluated for how well a particular scene is aligned to the whole dataset. A likelihood can then be computed that a particular scene resolves to all the synthetic scenes. That can provide a likelihood that this particular scene is synthetic. This can be performed in at least one embodiment by using kernel density estimation (KDE). KDE can be used to obtain a probability that this scene belongs to the distribution of synthetic scenes. KDE can also be used to compute the probability that this scene belongs to the distribution of real scenes. In at least one embodiment, a ratio of these values can be analyzed, and the system can be optimized using this ratio. Maximizing (the log of) this ratio as the reward function for a scene provides a signal that can be optimized for every single scene.

Figure 5:
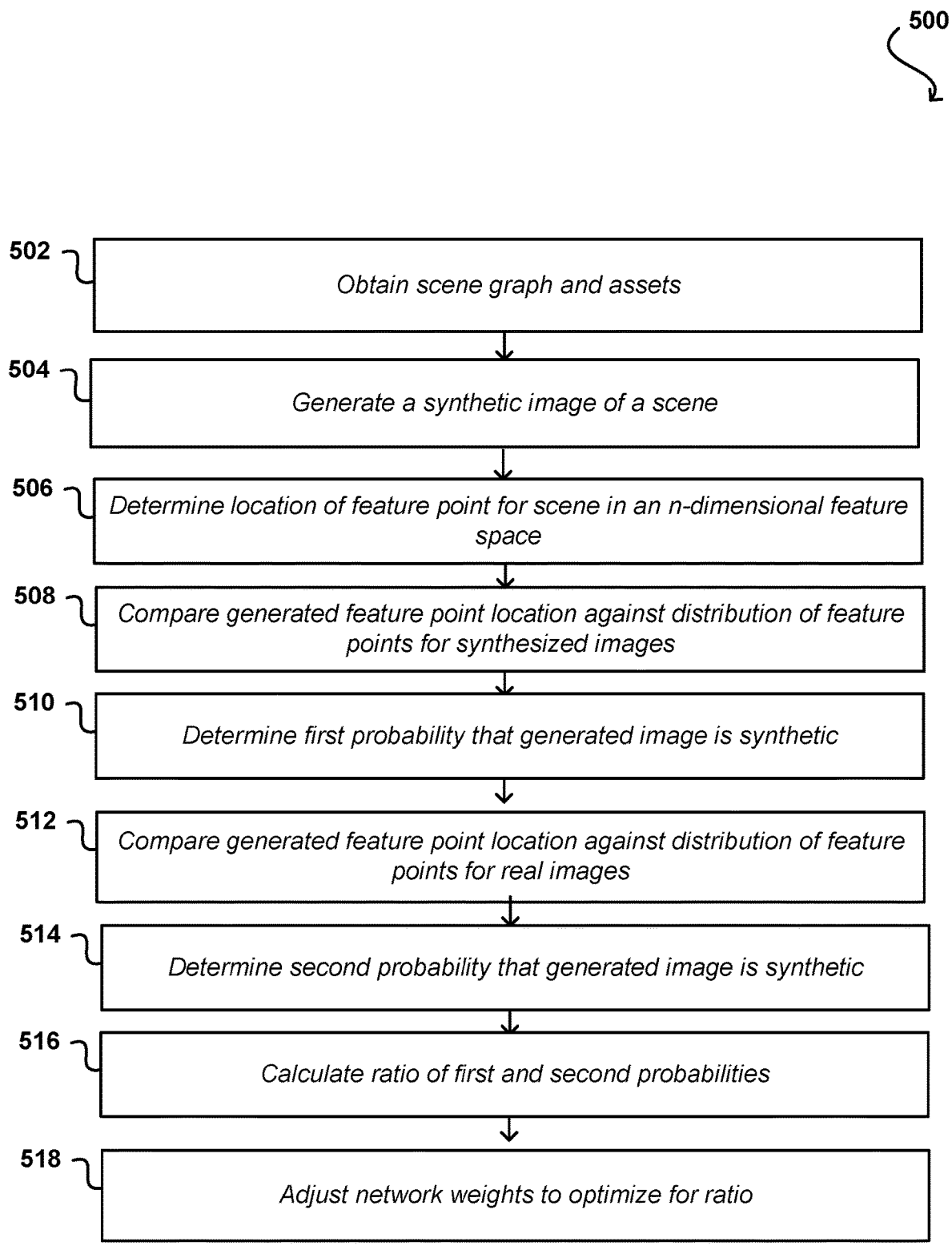
FIG. 5 illustrates a process for training a network, according to at least one embodiment.
Figure 6:
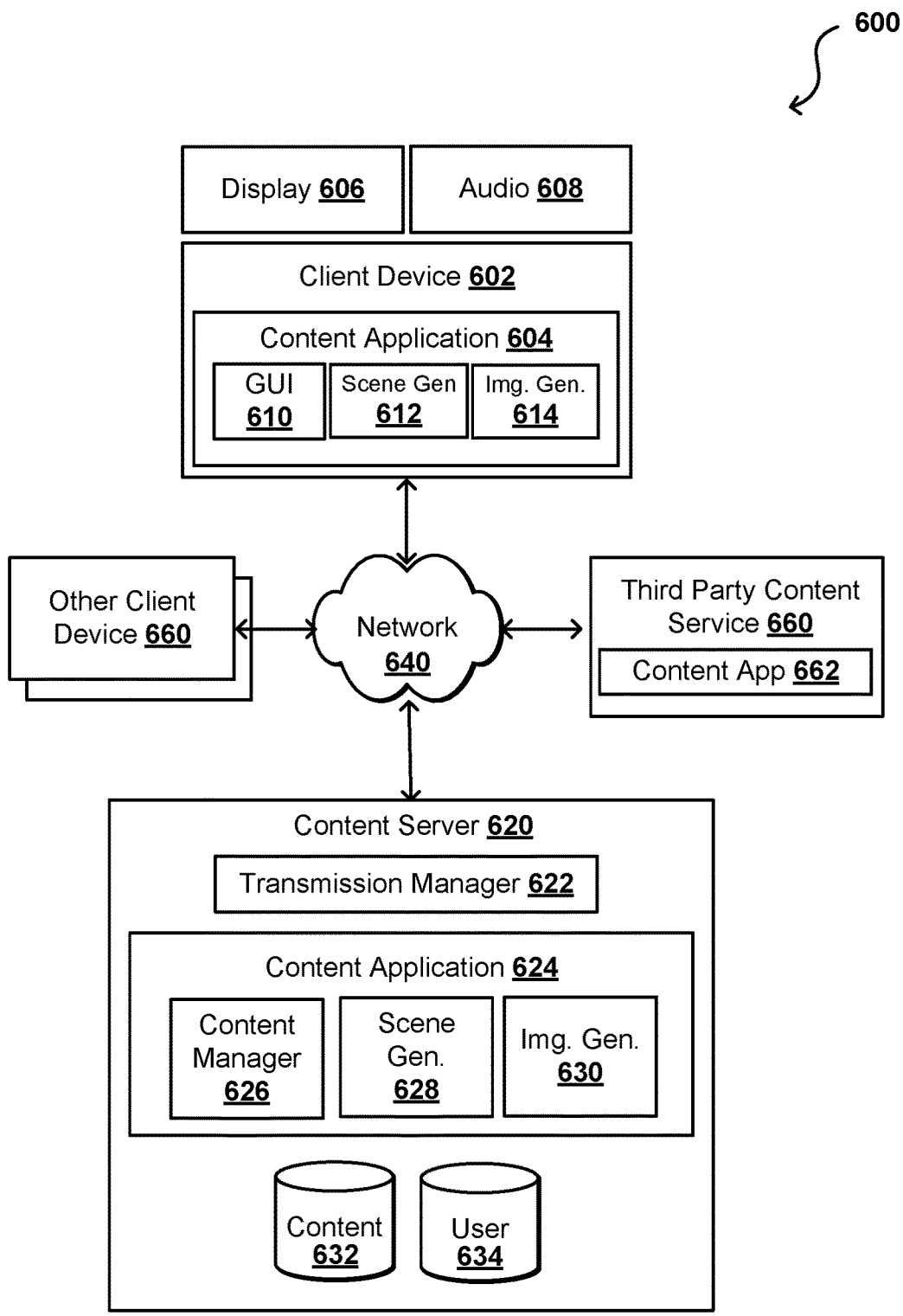
FIG. 6 illustrates components of a system for generating a scene graph, according to at least one embodiment.

FIG. 5 illustrates an example process 500 for training a network to generate realistic images that can be utilized in accordance with at least one embodiment. In this example, a scene graph and assets are obtained 502, such as described above with respect to FIG. 4. The scene graph and assets can be used to generate 504 a synthetic image of a scene. A location of a feature point in an n-dimensional feature space can be determined 506 for this generated image, where n can equal a number of rules in a set used to generate the scene graph. This feature point for the generated image can be compared 508 against a distribution of feature points for synthetic images in that feature space. A first probability can be determined 510 that this generated image is synthetic based on the comparison. The feature point for the generated image can also be compared 512 against a distribution of feature points for real images in that feature space. A second probability can be determined 514 that this generated image is realistic based on the comparison. A ratio of these two probabilities can be calculated 516, and one or more weights for the network being trained can be adjusted in order to optimize for this ratio.

Another embodiment could utilize a discriminator of a GAN. The GAN could be trained to determine whether a generated scene is realistic, using the discriminator portion. The network can then be optimized so that the discriminator determines with high probability that a scene is real. Such an approach may be challenging, however, as current renderers generate high quality images but these images can still be identified as not being real, captured images, such that a discriminator may predominantly be able to tell the difference even though the images may be structurally very similar. In such an instance, a GAN might collapse during training because the discriminator cannot provide any valuable information because the rendered image will never confuse the discriminator as being a real image. In at least one embodiment, image-to-image translation can be performed before providing this image data to a GAN to try to improve the appearance of these synthesized images. Image-to-image translation can help to reduce the style gap between real and synthetic images, helping with low level visual aspects as may relate to textures or reflections that can cause an image to appear synthetic instead of real. This may be advantageous for systems that utilize ray tracing, for example, to generate reflections and other lighting effects.

In another embodiment, a process can be used to ensure termination. A neural network can be defined to run through a certain number of steps, such as 150 steps for computational reasons. It is possible that this number will be too low to completely generate the scene graph based on a larger number of rules to be analyzed and expanded. Thus, the generated scene graph would be incomplete and would result in an inaccurate rendering. In at least one embodiment, a network can be allowed to run to its limit. If the limit is insufficient for a scene, the remaining features can be determined, and a negative reward applied for the model to ever generate that feature again. Such an approach may result in a scene that does not include all features that were originally desired, but ensures that a scene can be rendered that matches rendering limits.

In at least one embodiment, a client device 602 can generate content for a session using components of a content application 604 on client device 602 and data stored locally on that client device. In at least one embodiment, a content application 624 (e.g., an image generation or editing application) executing on content server 620 may initiate a session associated with at least client device 602, as may utilize a session manager and user data stored in a user database 634, and can cause content 632 to be determined by a content manager 626 and rendered using a rendering engine, if needed for this type of content or platform, and transmitted to client device 602 using an appropriate transmission manager 622 to send by download, streaming, or another such transmission channel. In at least one embodiment, this content 632 can include assets that can be used by a rendering engine to render a scene based on a determined scene graph. In at least one embodiment, client device 602 receiving this content can provide this content to a corresponding content application 604, which may also or alternatively include a rendering engine for rendering at least some of this content for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or content database 634, to client device 602. In at least one embodiment, at least a portion of this content can be obtained or streamed from another source, such as a third party content service 660 that may also include a content application 662 for generating or providing content. In at least one embodiment, portions of this functionality can be performed using multiple computing devices, or multiple processors within one or more computing devices, such as may include a combination of CPUs and GPUs.

In at least one embodiment, content application 624 includes a content manager 626 that can determine or analyze content before this content is transmitted to client device 602. In at least one embodiment, content manager 626 can also include, or work with, other components that are able to generate, modify, or enhance content to be provided. In at least one embodiment, this can include a rendering engine for rendering image or video content. In at least one embodiment, a scene graph generation component 628 can be used to generate a scene graph from a rule set and other such data. In at least one embodiment, an image generation component 630, which can also include a neural network, can generate an image from this scene graph. In at least one embodiment, content manager 626 can then cause this generated image to be transmitted to client device 602. In at least one embodiment, a content application 604 on client device 602 may also include components such as a rendering engine, scene graph generator 612, and image generation module 614, such that any or all of this functionality can additionally, or alternatively, be performed on client device 602. In at least one embodiment, a content application 662 on a third party content service system 660 can also include such functionality. In at least one embodiment, locations where at least some of this functionality is performed may be configurable, or may depend upon factors such as a type of client device 602 or availability of a network connection with appropriate bandwidth, among other such factors. In at least one embodiment, a system for content generation can include any appropriate combination of hardware and software in one or more locations. In at least one embodiment, generated image or video content of one or more resolutions can also be provided, or made available, to other client devices 650, such as for download or streaming from a media source storing a copy of that image or video content. In at least one embodiment, this may include transmitting images of game content for a multiplayer game, where different client devices may display that content at different resolutions, including one or more super-resolutions.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for performing simulation operations to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
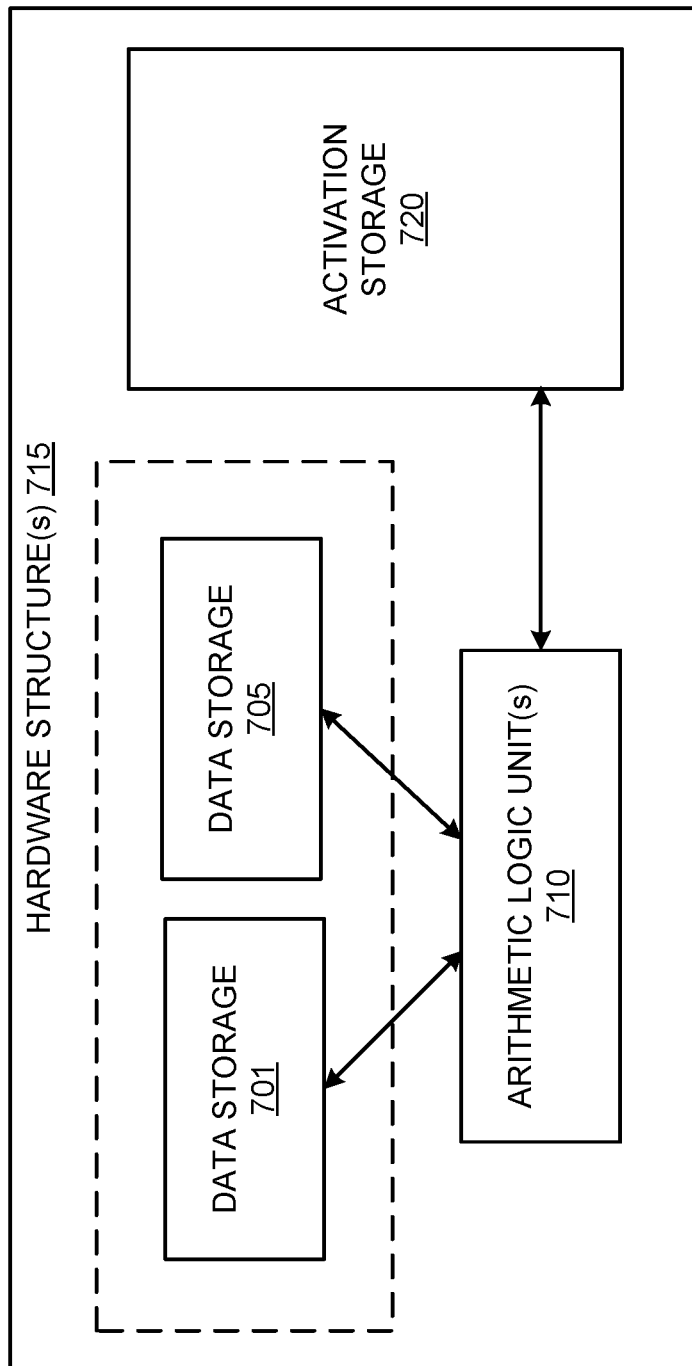
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7a may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7a may be used in conjunction with central processing unit ("CPU") hardware, graphics processing unit ("GPU") hardware or other hardware, such as field programmable gate arrays ("FPGAs").

Figure 7B:
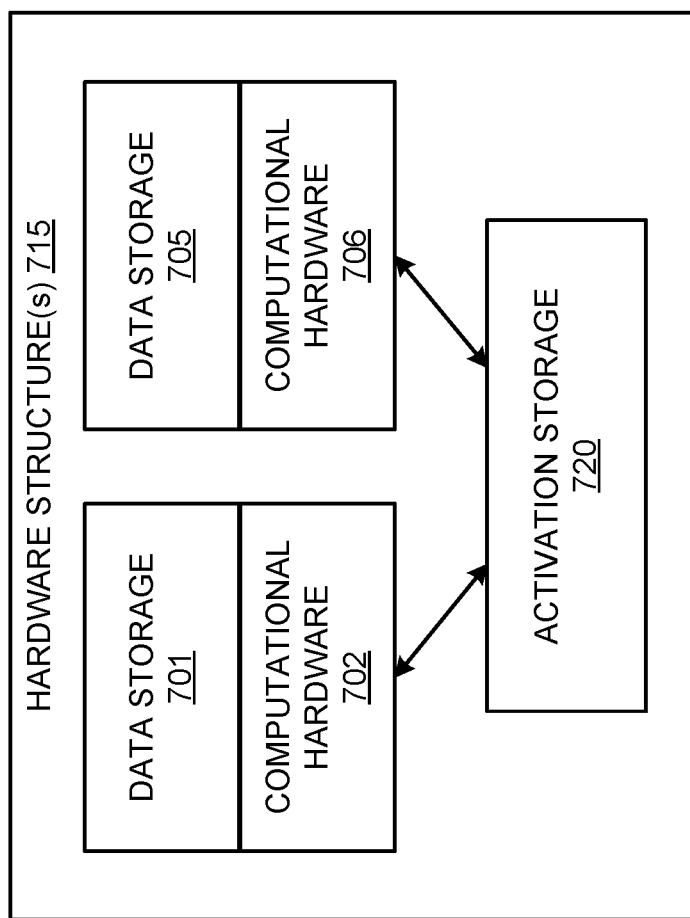
FIG. 7B illustrates inference and/or training logic, according to at least one embodiment.

FIG. 7b illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7b may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7b may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7b, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
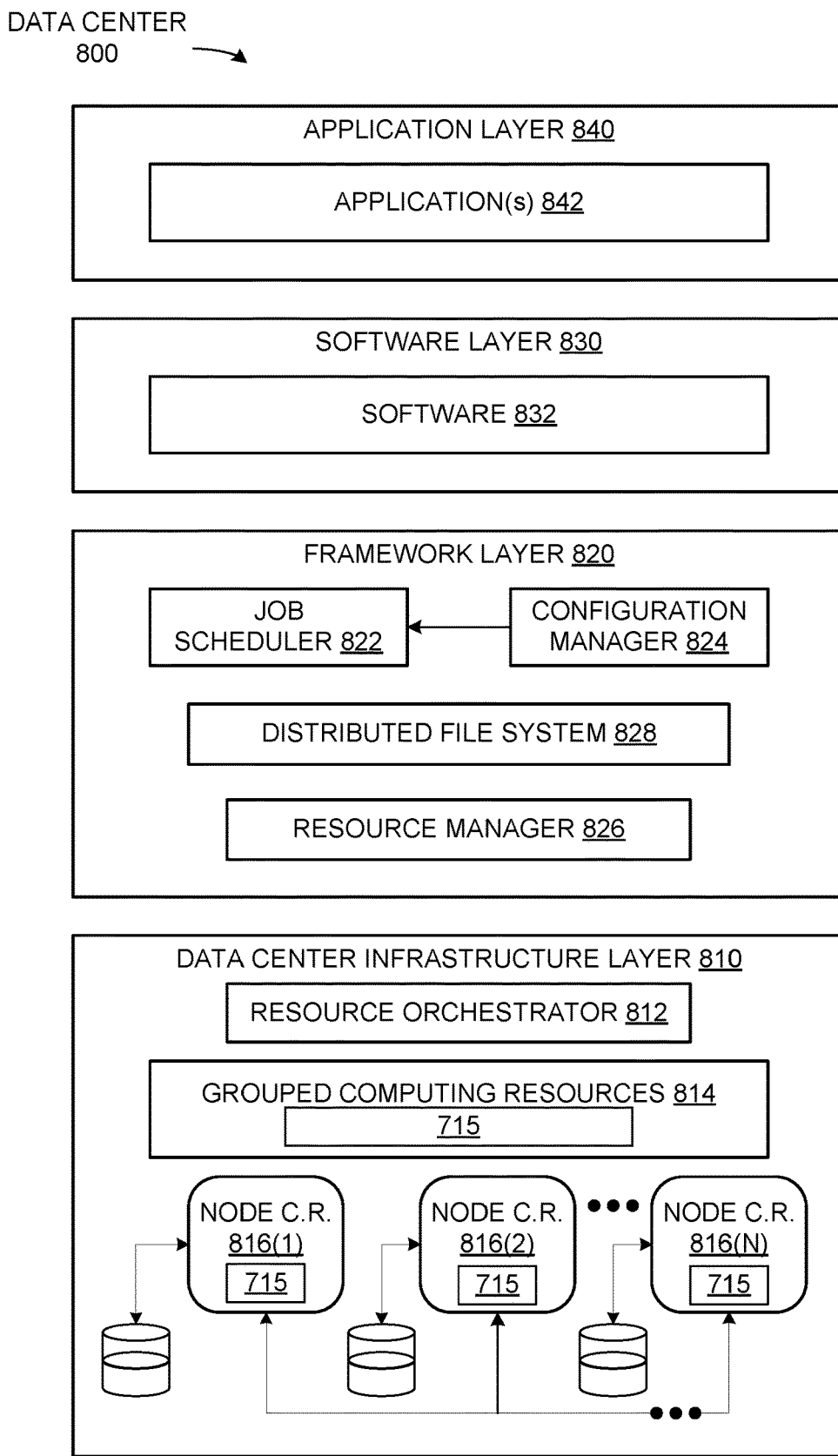
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to generate diverse scene graphs from one or more rule sets, which can be used to generate training data or image content representing one or more scenes of a virtual environment.

Computer Systems

Figure 9:
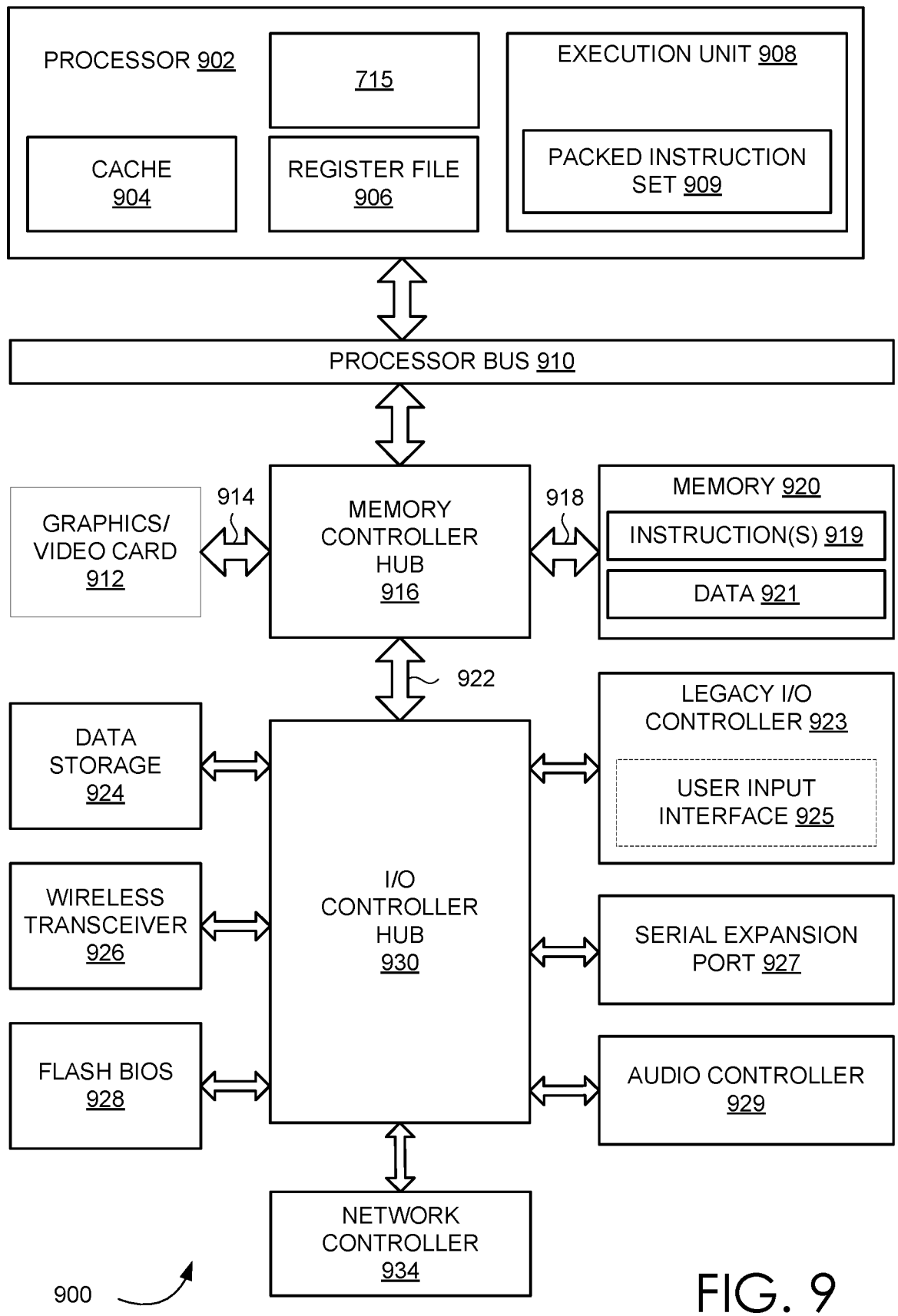
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to generate diverse scene graphs from one or more rule sets, which can be used to generate training data or image content representing one or more scenes of a virtual environment.

Figure 10:
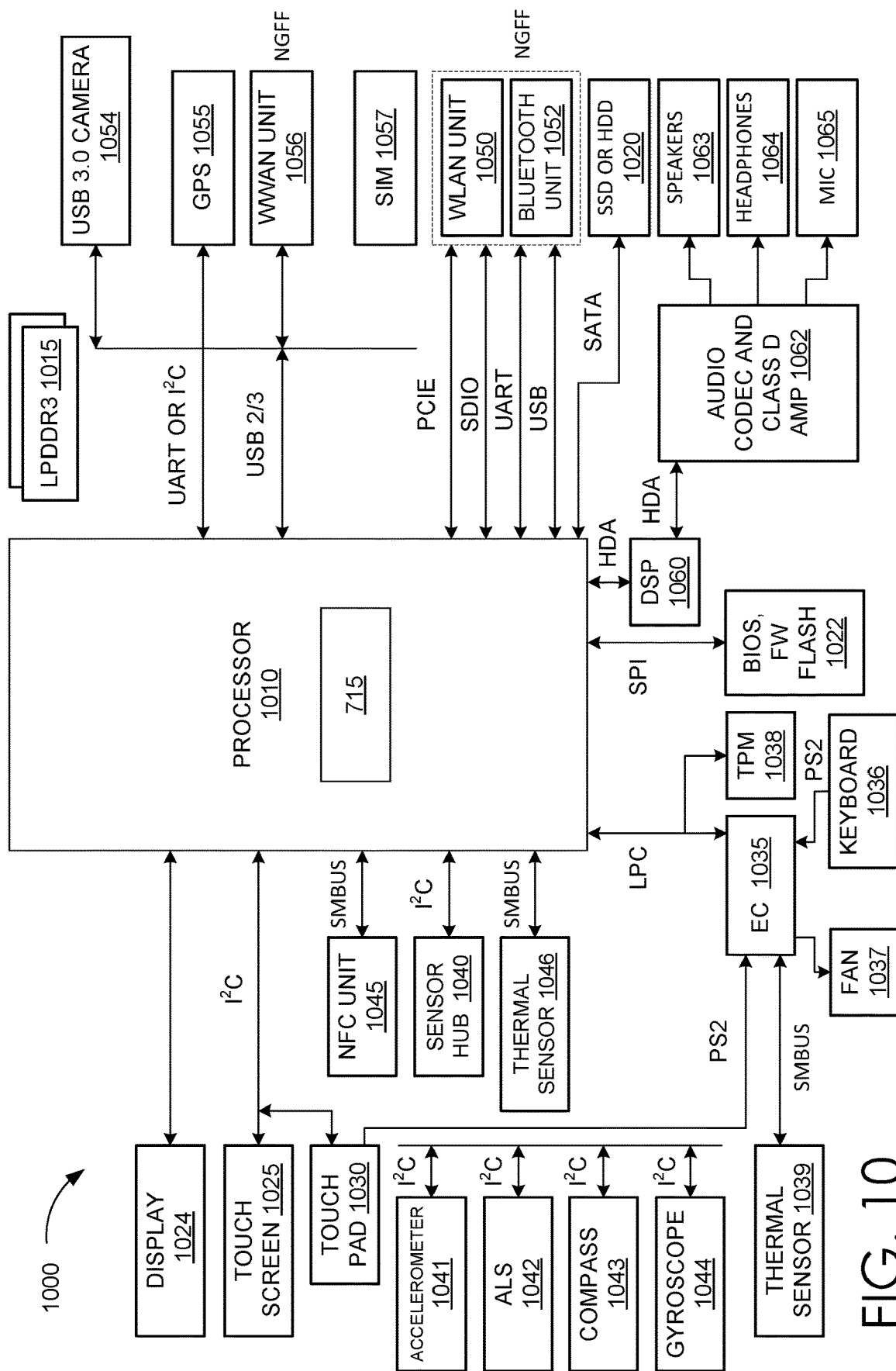
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7a and/or 7b. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to generate diverse scene graphs from one or more rule sets, which can be used to generate training data or image content representing one or more scenes of a virtual environment.

Figure 11:
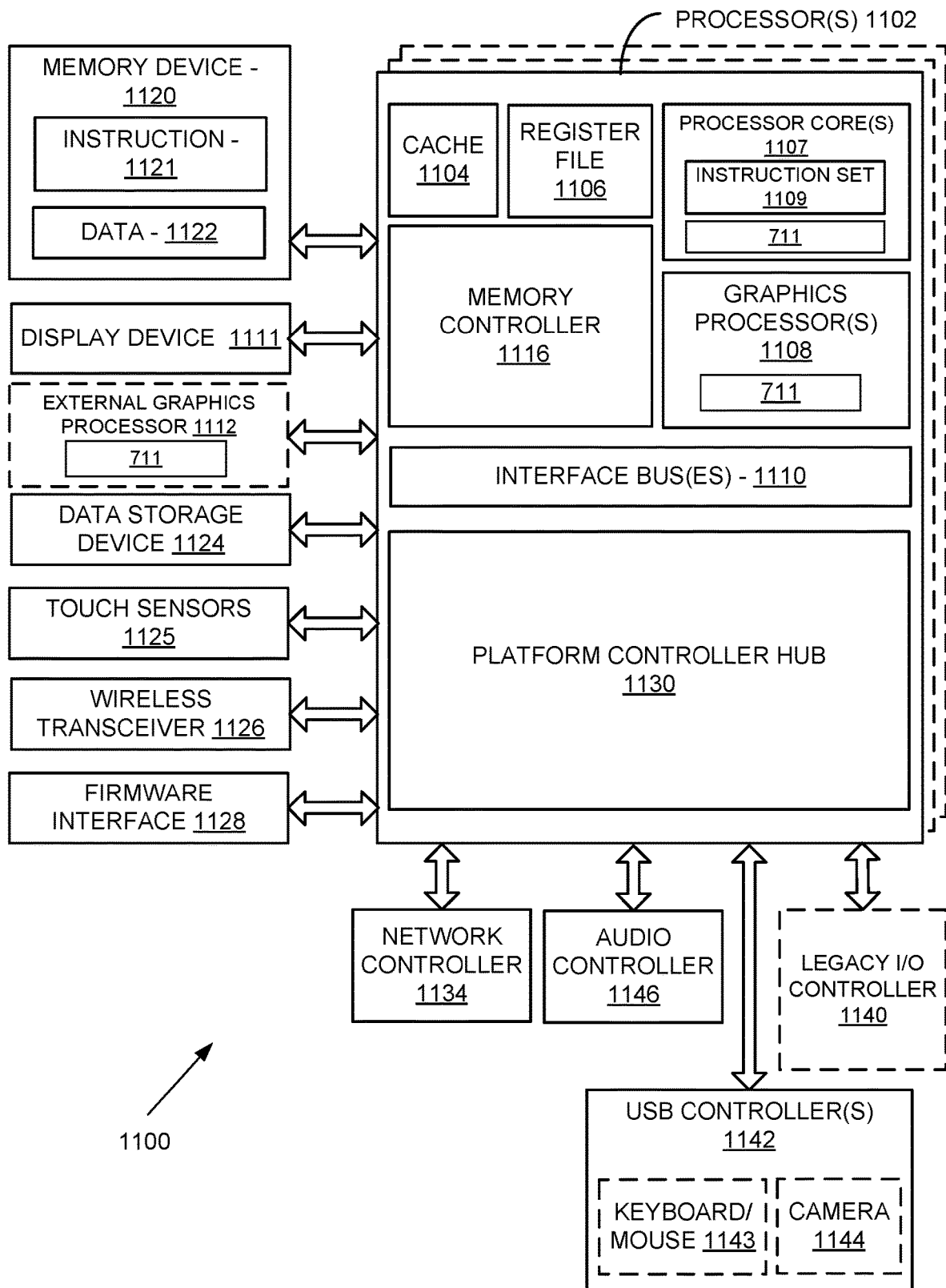
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to generate diverse scene graphs from one or more rule sets, which can be used to generate training data or image content representing one or more scenes of a virtual environment.

Figure 12:
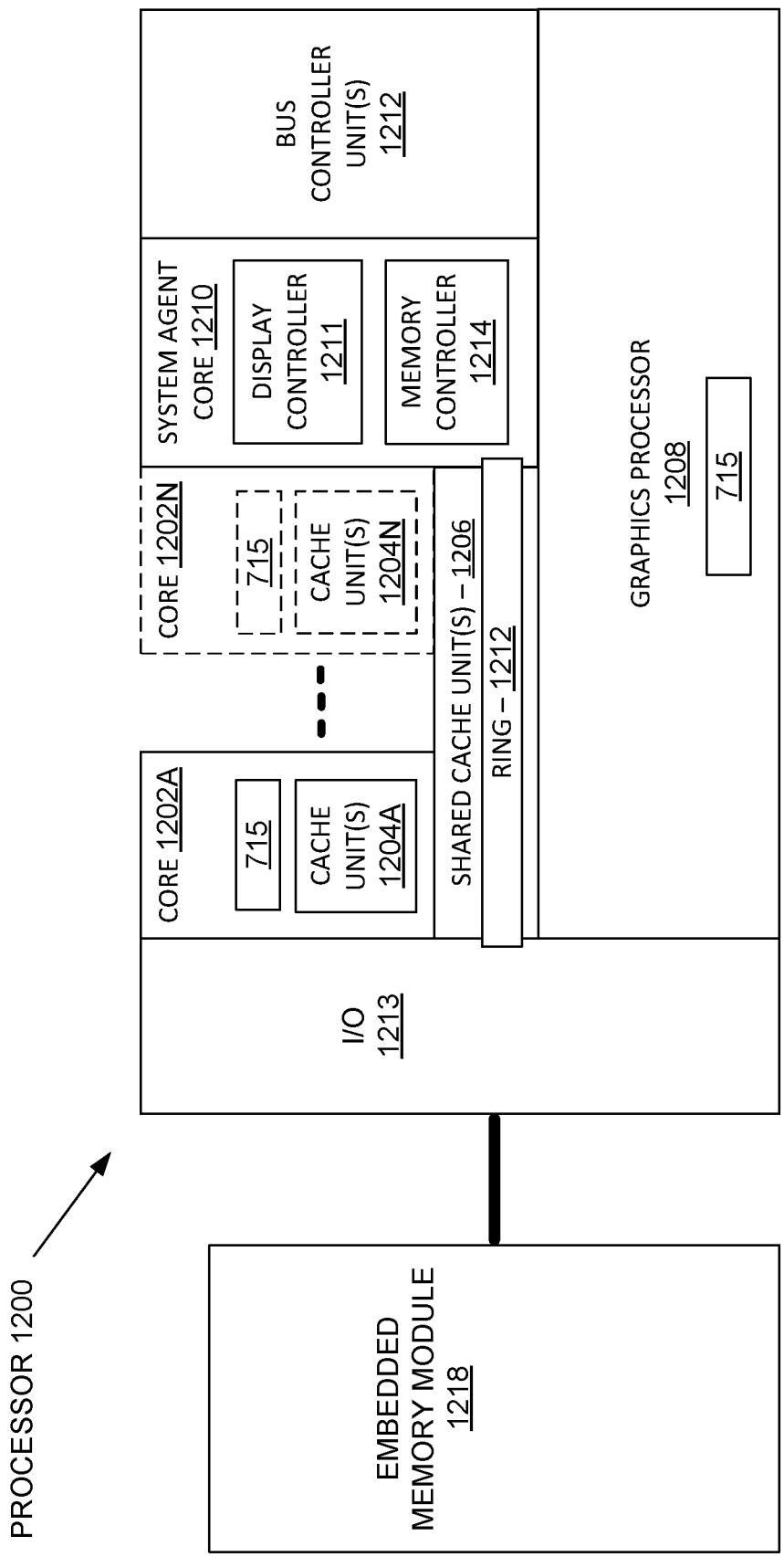
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multithreading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7a and/or 7b. In at least one embodiment portions or all of inference and/or training logic 715 may be incorporated into processor 1200. For example, in at least one embodiment, training and/or inferencing techniques described herein may use one or more of ALUs embodied in graphics processor 1512, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to generate diverse scene graphs from one or more rule sets, which can be used to generate training data or image content representing one or more scenes of a virtual environment.

Virtualized Computing Platform

Figure 13:
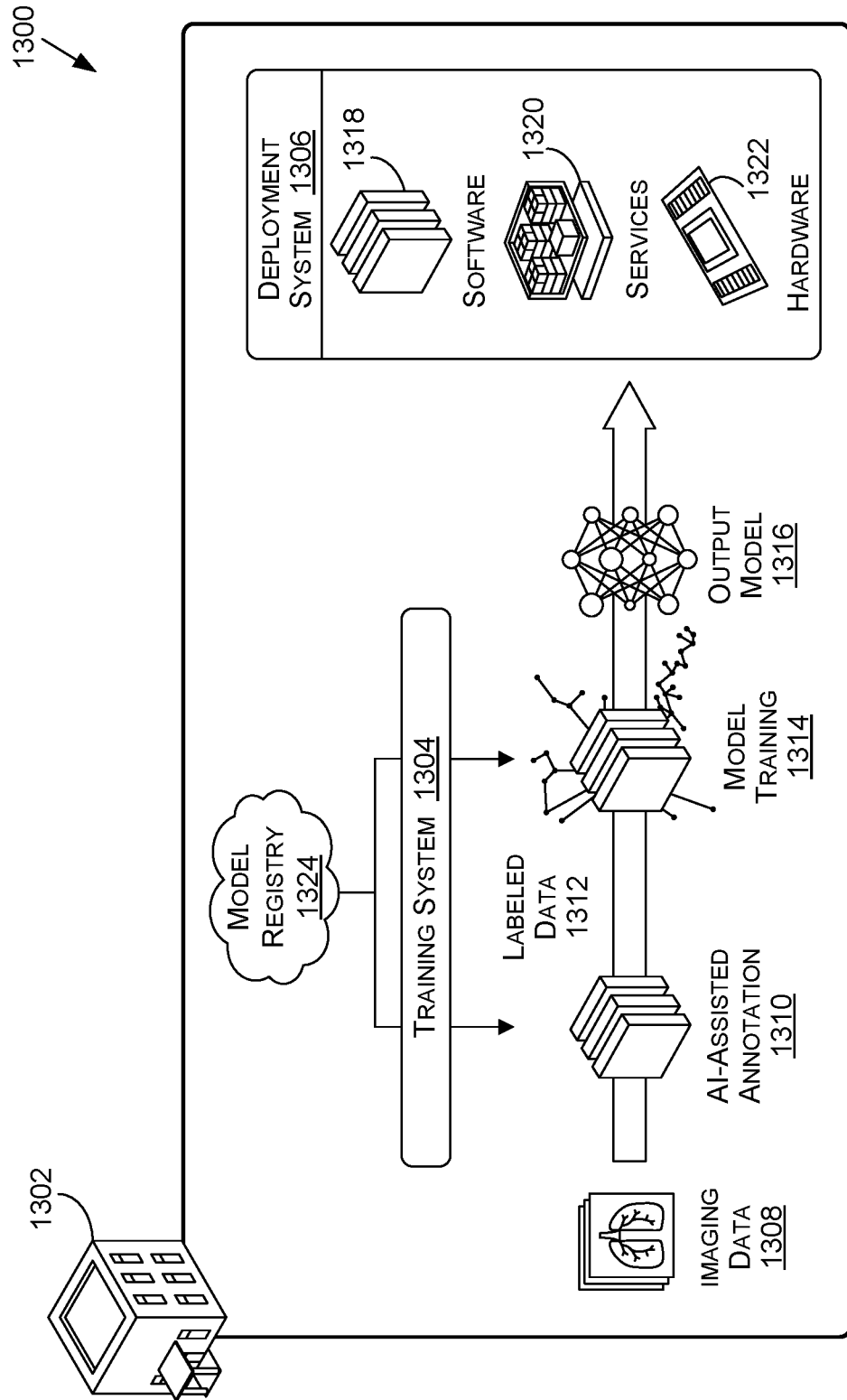
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
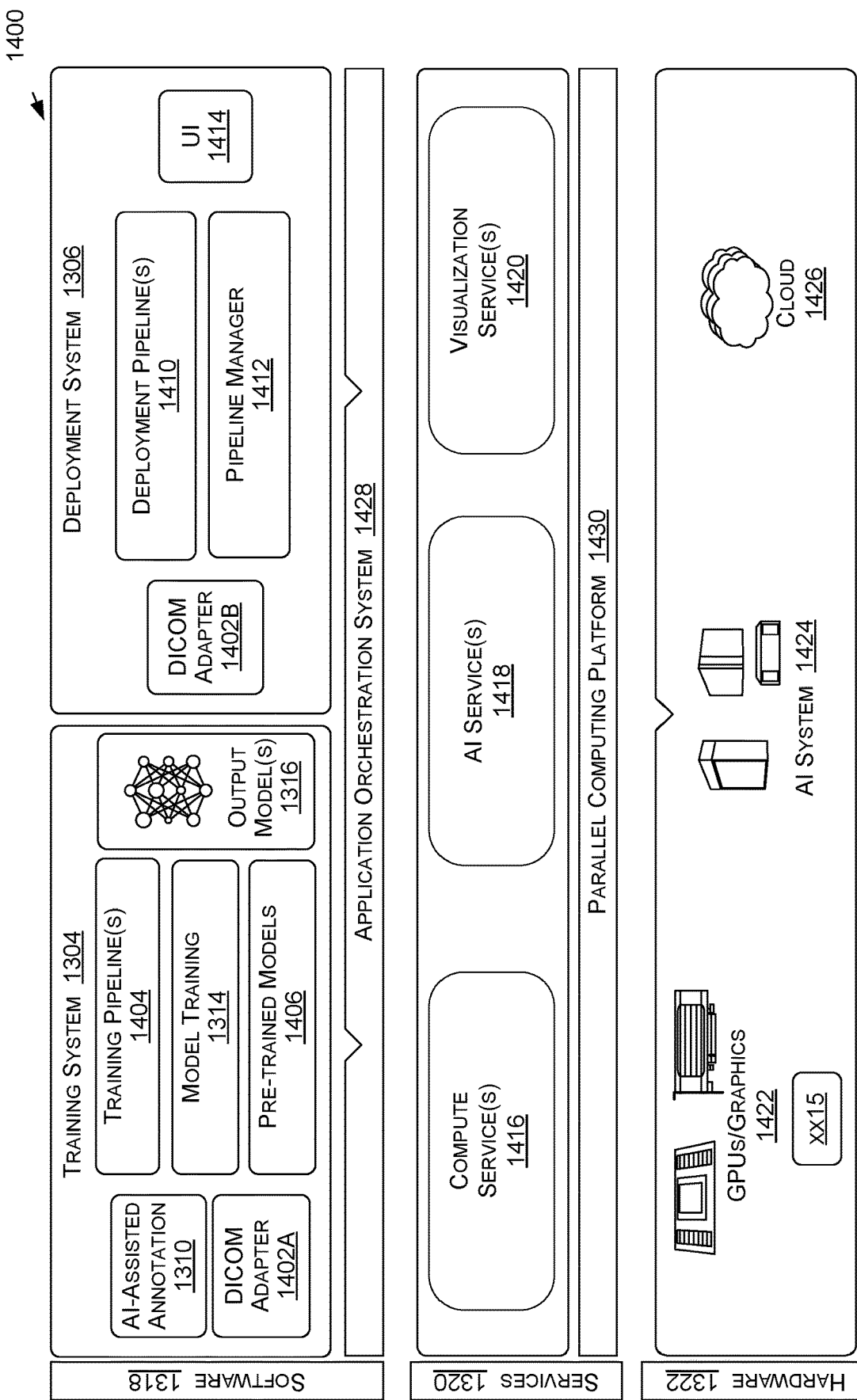
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 15B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an Mill machine, there may be a first deployment pipeline 1410, and where image enhancement is desired from output of an Mill machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12cc) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
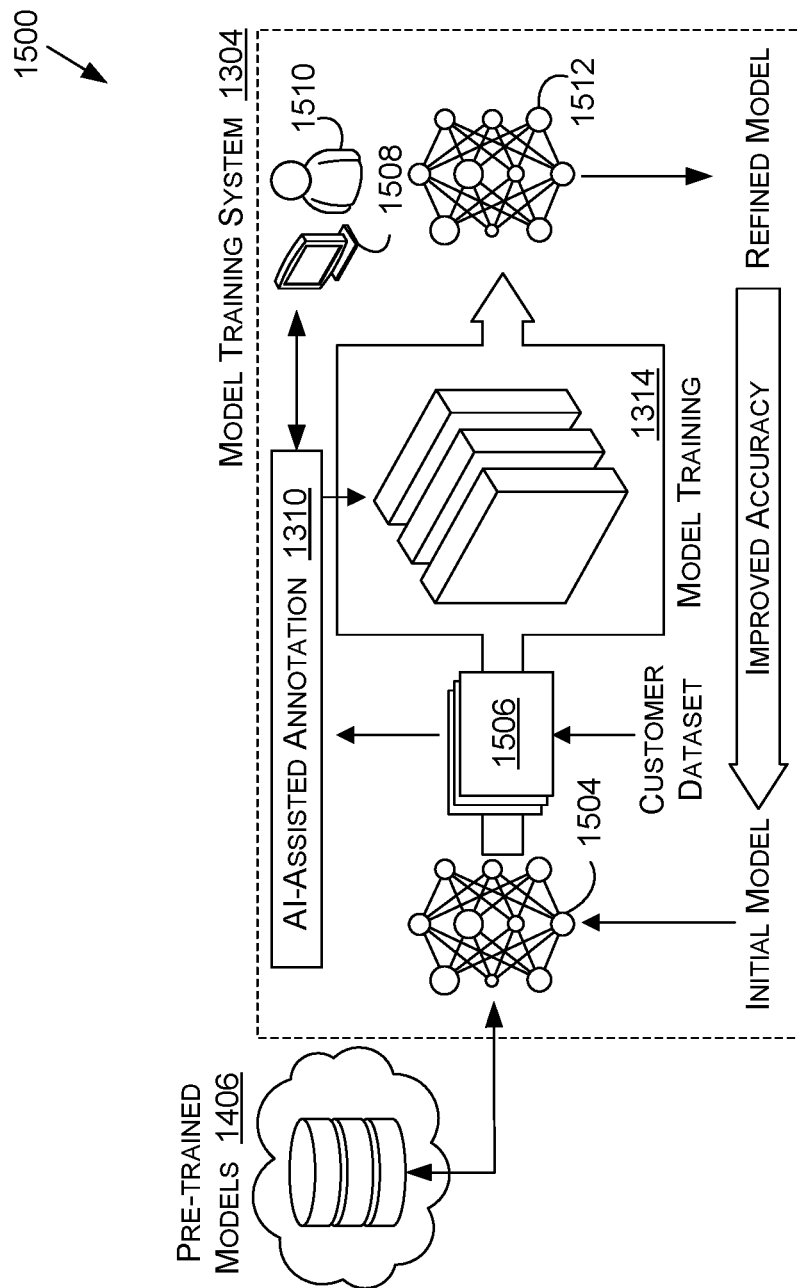

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1314 may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components can be used to generate diverse scene graphs from one or more rule sets, which can be used to generate training data or image content representing one or more scenes of a virtual environment.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
generating a scene structure using at least a subset of a plurality of rules from a rule set, the plurality of rules specifying relationships between types of objects in a scene;
determining one or more parameter values for one or more of the objects represented in the scene structure;
generating a scene graph based on the scene structure and including the parameter values; and
providing the scene graph to a rendering engine to render an image of the scene.

2. The computer-implemented method of claim 1, further comprising:
providing, to the rendering engine, a library of object-related content to be used to render the objects represented in the scene structure using the one or more parameter values for the objects.

3. The computer-implemented method of claim 1, further comprising:
causing the rendering engine to include at least one of object labels or scene structure information with the image of the scene, wherein the image is capable of being used as training data for training a neural network.

4. The computer-implemented method of claim 1, further comprising:
receiving input indicating that one of the rules or objects is not to be utilized for the scene;
updating the scene graph to reflect the input; and
providing the updated scene graph to the rendering engine to render an updated image of the scene.

5. The computer-implemented method of claim 1, further comprising:
utilizing the rule set to generate a diverse set of scene graphs; and
generating a virtual environment using the diverse set of scene graphs.

6. The computer-implemented method of claim 5, wherein the virtual environment is a gaming environment, and wherein the rendering engine is to use the diverse set of scene graphs to render one or more images of the gaming environment for one or more players of a game corresponding to the gaming environment.

7. The computer-implemented method of claim 5, further comprising:
utilizing the virtual environment in one or more testing simulations for one or more autonomous or semi-autonomous machines.

8. The computer-implemented method of claim 1, wherein the scene structure is generated from the rule set in an unsupervised manner without data annotation on one or more input images.

9. The computer-implemented method of claim 1, further comprising:
assigning probabilities to rules of the rule set; and
selecting the subset of the plurality of rules by sampling the rules according to the probabilities.

10. The computer-implemented method of claim 9, further comprising:
determining a scene mask to indicate which one or more rules of the rule set are able to be selected through the sampling.

11. The computer-implemented method of claim 1, further comprising:
generating the scene structure using an iterative process in which, at one or more of a plurality of time steps, a determination is made whether to perform expansion for one or more object types in the scene structure, the object types being positioned at varying levels in a hierarchical scene structure.

12. The computer-implemented method of claim 1, wherein a generative model is used to generate the scene structure using the rule set.

13. The computer-implemented method of claim 1, further comprising:
generating a latent vector as input to the generative model, the latent vector having a length equal to a number of rules in the rule set.

14. A system, comprising:
at least one processor; and
memory including instructions that, when executed by the at least one processor, cause the system to:
generate a scene structure using at least a subset of a plurality of rules from a rule set, the plurality of rules specifying relationships between types of objects in a scene;
determine one or more parameter values for one or more of the objects represented in the scene structure;
generate a scene graph based on the scene structure and including the parameter values; and
provide the scene graph to a rendering engine to render an image of the scene.

15. The system of claim 14, wherein the instructions when executed further cause the system to:
cause the rendering engine to include at least one of object labels or scene structure information with the image of the scene, wherein the image is capable of being used as training data for training a neural network.

16. The system of claim 14, wherein the instructions when executed further cause the system to:
receive input indicating that at least one of the rules or objects is not to be utilized for the scene;
update the scene graph to reflect the input; and
provide the updated scene graph to the rendering engine to render an updated image of the scene.

17. The system of claim 14, wherein the instructions when executed further cause the system to:
utilize the rule set to generate a diverse set of scene graphs; and
generate a virtual environment using the diverse set of scene graphs.

18. The system of claim 14, wherein the system comprises at least one of:
- a system for performing graphical rendering operations;
- a system for performing simulation operations;
- a system for performing simulation operations to test or validate autonomous machine applications;
- a system for performing deep learning operations;
- a system implemented using an edge device;
- a system incorporating one or more Virtual Machines (VMs);
- a system implemented at least partially in a data center; or
- a system implemented at least partially using cloud computing resources.

19. A method for synthesizing training data, comprising:
- obtaining a rule set including a plurality of rules specifying relationships between types of objects in a scene;
- generating a plurality of scene structures based on the plurality of rules;
- determining one or more parameter values for each of the objects represented in the plurality of scene structures;
- generating a plurality of scene graphs based on the plurality of scene structures and including the parameter values; and
- providing the plurality of scene graphs to a rendering engine to render a set of images including data for the objects represented in the images, the set of images representing training data for use in training one or more neural networks.

20. The method of claim 19, further comprising:
providing, to the rendering engine, a library of object-related content to be used to render the objects represented in the scene structure using the one or more parameter values for the objects.

21. The method of claim 19, further comprising:
- receiving input indicating that one of the rules or objects is not to be utilized;
- updating the plurality of scene graphs to reflect the input; and
- providing the updated scene graphs to the rendering engine to render an updated set of images.

22. The method of claim 19, wherein the scene structure is generated from the rule set in an unsupervised manner without data annotation on one or more input images.

23. The method of claim 19, further comprising:
- assigning probabilities to rules of the rule set; and
- selecting a subset of the plurality of rules for respective scene structures by sampling the rules according to the probabilities.

* * * * *